Oct. 12, 1943.     J. O. PARR, JR     2,331,623
SEISMIC CIRCUIT
Filed March 30, 1940     2 Sheets-Sheet 2
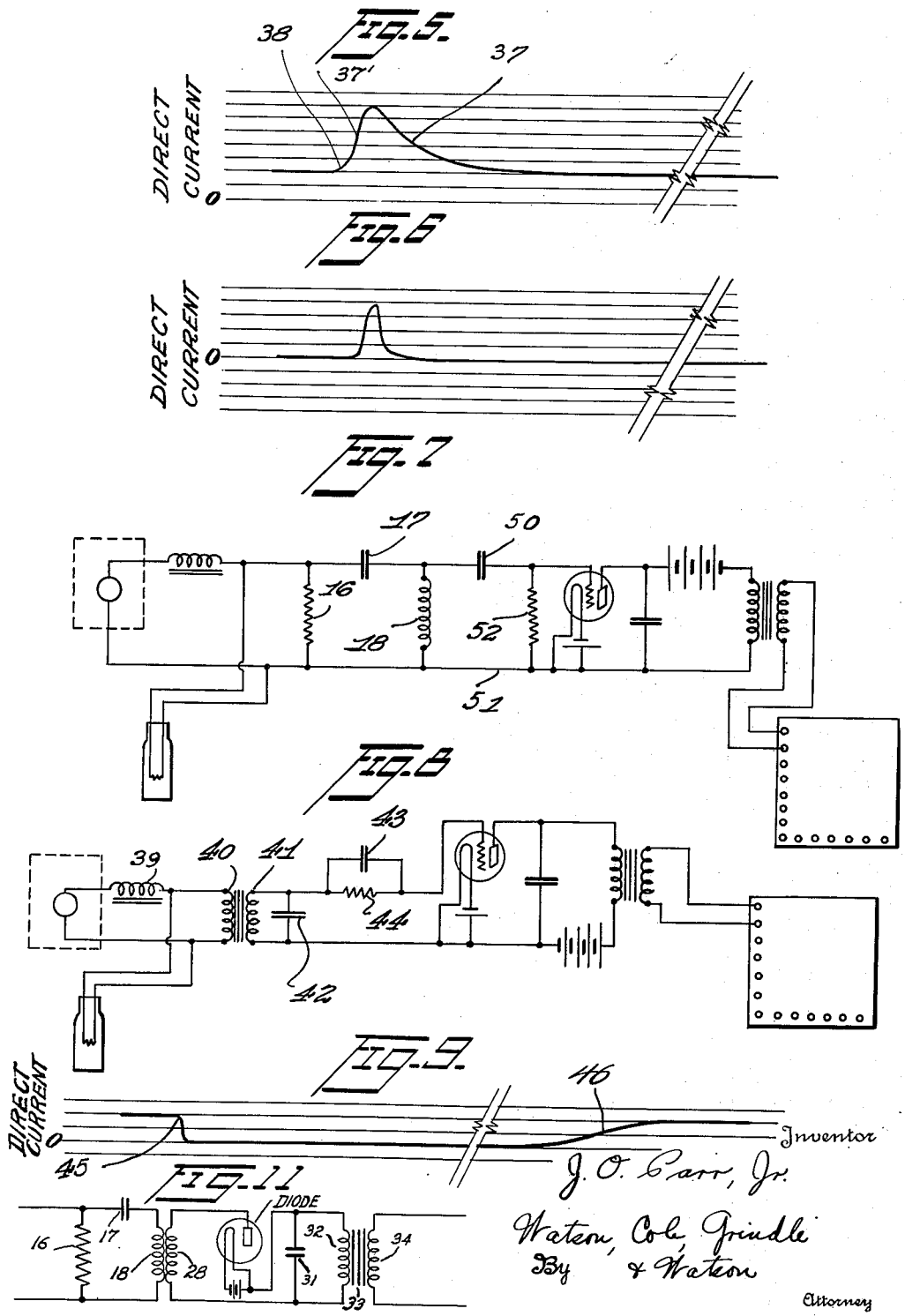

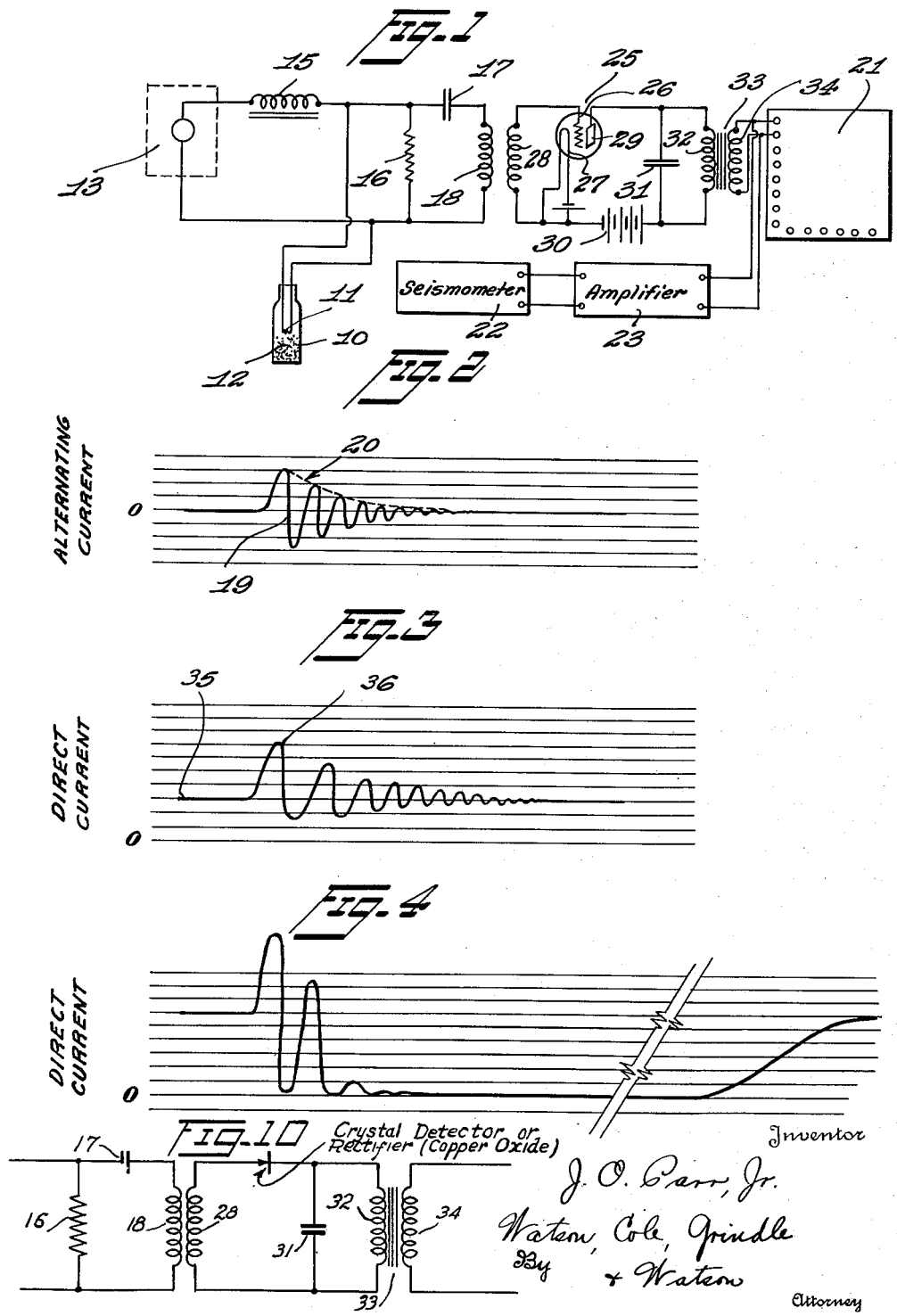

Patented Oct. 12, 1943

2,331,623

UNITED STATES PATENT OFFICE 2,331,623

SEISMIC CIRCUIT

Josephus O. Parr, Jr., San Antonio, Tex., assignor to Olive S. Petty, San Antonio, Tex.

Application March 30, 1940, Serial No. 326,947

11 Claims. (Cl. 234—1.5)

This invention relates to methods of and apparatus for use in seismic surveying and more particularly to such methods of and apparatus for recording the time-break of the blast used for the purpose of creating the artificial seismic waves, the times of arrival of which are subsequently recorded at several seismometer stations remote from the "shot-point."

It is a general object of the present invention to provide novel and improved methods of and apparatus for obtaining time-break recordings of superior quality.

More specifically it is an object of the invention to make use of a closed resonant circuit, so coupled with the circuit of the electric blasting cap that it is set into oscillation simultaneously with the breaking of the bridge wire in the cap, and to rectify the oscillations to direct current, high-frequency pulsations which are then recorded by apparatus which senses only the average value of the pulsating current. In this manner sharp and distinct time-break traces are obtained on the record.

Another important object of the invention consists in the provision of means serving to always produce substantially the same size time-break record, both as regards amplitude and duration.

An important feature of the invention resides in the provision of a closed resonant circuit, oscillations in which are initiated by the breaking of the blasting cap bridge wire, for thereby this circuit can be given any desired damping characteristic so that the operation of the subsequent rectifying or detecting means can be controlled to give certain desired characteristics to the recorded trace.

A further feature of the invention resides in the adjustment of the characteristics of the various circuits so that they are ineffective to successive energizations whereby seismic records may be made on the same trace as that used for the time-break without any interference.

Other and further features and objects of the invention will be more apparent to those skilled in the art upon a consideration of the accompanying drawings and following specification wherein are disclosed several exemplary embodiments of the apparatus necessary for carrying out the improved methods, with the understanding that such changes may be made therein as fall within the scope of the appended claims without departing from the spirit of the invention.

In said drawings:

Figure 1 is a wiring diagram and schematic showing of the parts and circuits necessary for recording the time-break and the operation of a seismometer for geophysical prospecting;

Figure 2 is a curve representative of the transient voltage variations in the resonant circuit of Figure 1;

Figure 3 represents the plate or output current pulsations as the result of feeding the oscillation voltages of Figure 2 to the input of a thermionic tube;

Figure 4 is a view similar to Figure 3 where grid-condenser, grid-leak excitation of the thermionic tube is used;

Figure 5 represents the average of the plate current flow of Figure 3 in the output of the thermionic tube, which average current serves to operate the recorder;

Figure 6 shows the current output after passing through a transformer or where other means are used for providing a sharp cut-off;

Figure 7 is a view similar to Figure 1 showing a slightly different arrangement of circuits;

Figure 8 illustrates another variation of circuits adapted for producing results similar to those obtained from the apparatus of Figure 7;

Figure 9 is a view similar to Figure 5 showing the average of the plate current flow of Figure 4 in the output of a thermionic tube operated with grid-condenser and grid-leak of high resistance;

Figure 10 is a view similar to Figure 1 but showing the use of a rectifier other than the thermionic type; and Figure 11 is a view similar to Figure 10 showing a vacuum tube diode rectifier.

When making use of seismic surveying for geophysical prospecting the almost standardized practice requires a source of artificial shock usually obtained by setting off a charge of high explosive such as dynamite or blasting gelatin. The seismic waves so created travel into the earth and are reflected from various discontinuities therein and are received at a plurality of seismometer stations spaced at various distances longitudinally on the surface of the earth from the source of shock. Each of the seismometers is adapted to respond to the arrival of the seismic waves reflected from various strata and they are all connected to a single recording apparatus for producing on one chart a plurality of traces each being the record of the operation of one of the seismometers. It is essential that on this same record the exact time of firing of the charge should appear so that computations can be made of the time of travel of the seismic waves to each of the seismometers.

Various methods have been suggested and used commercially for recording this time of shock or as expressed in the industry the "time-break." Most of these methods have been subject to difficulties in accordance with conditions and the results have not always been satisfactory, reliable or consistent. It is characteristic of most of the methods that they rely on a change in current in the electric circuit between the blasting generator and the bridge wire of the blasting cap used for detonating the charge.

In accordance with the present invention, voltage changes in the blasting circuit are made use of in order to obtain a sharp and readily usable time-break where no doubt can exist as to the exact instant of the charge exploding. The present invention proposes to use the voltage changes in a novel way. For instance, the voltage in the blaster-cap circuit increases rapidly and violently when the bridge wire of the cap is broken as a result of the explosion of the charge. This sudden increase in voltage may be used to cause oscillations in a resonant circuit, the decrement of which is adjusted by varying the characteristics of the several elements of the circuit and the voltage changes of these oscillations, properly treated, may be used to actuate a recording device which is not responsive to frequencies as high as those of the resonant circuit. The frequency of these oscillations is determined by the constants of the circuit and is practically independent of the characteristics of cap current.

To assist in this operation it is desirable to interpose between the resonant circuit and the recording means some apparatus for converting the oscillations to direct current pulsations which can then be so filtered as to provide an average voltage change or current change at relatively low frequency which can be directly sensed and recorded by the same type of recording mechanism used for recording the low-frequency seismic waves as picked up by the various seismometers. In this manner one of the moving elements of a recording galvanometer may be used to record both the time-break and the times of arrival of reflected waves at one of the seismometer stations, but in order that this may be done satisfactorily the time-break must be recorded quickly without undue disturbance to the moving galvanometer element so that it can become quiescent in readiness for recording the seismometer operation which takes place only a fraction of a second after the explosion.

Referring now to the drawings and particularly to Figure 1 there is shown all of the apparatus necessary for firing a blast, recording the time-break, and recording the operation of one seismometer. At 10 is shown a conventional blasting cap such as has been available on the market for years and having the bridge wire 11 which is adapted to be heated to ignite the fulminating material 12 in the cap which serves to set off the main explosive (not shown). This cap is connected by conductors across the output of the blasting machine 13 which comprises a direct current generator usually arranged for manual operation by means of a plunger. The construction of such apparatus is more or less conventional. In accordance with the present invention it is preferred to include in the circuit between the cap and the blaster some current limiting means such as the inductance 15 which prevents rapid current build-up and insures a relatively slow heating of the bridging wire so that the charge always fires before the wire is burned out electrically. In this manner the wire is broken by the blast and thus at the exact instant thereof, a very important feature.

A resistance 16 of higher value than the bridge wire is shunted across the cap circuit and in accordance with the first embodiment of the invention is a part of a closed resonant circuit also including the condenser 17 and the inductance 18.

In operation, when the bridge wire 11 breaks, the load is instantly removed from the blasting generator and the voltage thereof suddenly increases. This effect is augmented by the practical cessation of current flow so that the inductance 15 no longer exerts its choking action. This sudden increase in voltage applied across the resistor 16 sets the resonant circuit into oscillation. The frequency of oscillation is determined solely by the constants of the elements 16, 17 and 18 and in accordance with the formula $$f = \frac{1}{2\pi}\sqrt{\frac{1}{LC} - \frac{R^2}{4L^2}}$$

where R is the resistance of 16, C is the capacity of 17, and L is the inductance of 18. The decrement of the circuit may be adjusted by changes in R, L or C and is represented by $$\frac{R}{2L} \frac{\pi}{\sqrt{\frac{1}{LC} - \frac{R^2}{4L^2}}}$$

A reference to Figure 2 where voltage in the resonant circuit is plotted against time will show how the voltage increases suddenly as in curve 19 from a value, determined by that existing prior to the breaking of the bridge wire, to a maximum, then drops down through zero and continues to oscillate at decreasing amplitude in accordance with the decrement as represented by the dotted line 20.

By any suitable means the results of the voltage fluctuations of the resonant circuit as shown in Figure 2 may be applied to one moving element of the recording galvanometer 21, which element is also shown as connected to the seismometer 22 through an appropriate amplifier 23.

In accordance with Figure 1 the oscillating circuit is associated with the galvanometer by means of an interposed thermionic tube 25, the input circuit of which includes the grid 26 and cathode 27. This input circuit is fed from a coil or inductance 28 shown as inductively coupled to the coil 18. The coils may constitute either an air or iron core transformer and obviously other known means may be used for coupling the input or control circuit of the tube to the oscillating circuit. The output circuit from the tube comprises its plate 29, an anode battery 30, a by-pass condenser 31, and the primary winding 32 of an audio frequency transformer 33, the secondary 34 of which is connected to the same element of the recording galvanometer as associated with the seismometer 22.

The thermionic tube 25 acts a detector or rectifier of the oscillating voltages induced in the input circuit thereof. The tube bias is adjusted (with the use of a C battery if necessary) so that the tube functions on one of the curved portions of the plate-current, grid-voltage characteristic curve. If the tube is adjusted for operation on the lower curved portion, then the plate current is increased above the normal more for a positive signal than it is decreased below this normal for an equal negative signal applied to the grid.

Referring now to Figure 3 it will be seen that under the above conditions the normal plate current, represented at 35, and which flows continuously even though the grid is not excited by a signal is represented as somewhat above the zero current line. Immediately upon excitation of the grid by a positive fluctuation of voltage in the resonant circuit, such as shown by the first rise in the curve 19 of Figure 2, there will be an instantaneous increase in plate current to, for instance, 36. As the oscillating voltage changes through zero to a minus value, the plate current will drop off but will not move below the zero line since the current can flow in only one direction in the plate circuit. Continued oscillation voltages of decreasing amplitude, as shown in the curve of Figure 2, when applied to the grid produce the plate current curve of Figure 3, and in this curve the changes in current are at the same frequency as the oscillations in the resonant circuit shown in Figure 2, and are much too high to be appreciated by the relatively slow moving and highly damped element of the recording galvanometer. The by-pass condenser 31 passes these high frequency pulsations, but the inductance of the primary 32 of the transformer serves to iron them out so that the current passing through this primary is such as illustrated in the curve 37 of Figure 5, being an average of the high and low loops of Figure 3.

It will be noted that this curve of Figure 5 which would be substantially reproduced by the recording galvanometer, except for variations later to be described, has a sharp point of inflection 38 at its inception which is the result of controlling the vacuum tube by the resonant circuit which goes into oscillation substantially instantly upon the breakage of the bridge wire and applies immediately a high potential of positive character to the grid of the vacuum tube. The change of potential of the grid is followed instantly by the rapid increase in plate current represented by the steep portion 37' of the curve of Figure 5. The exact point of inflection 38 can readily be ascertained by the computer and forms the start for measurements on the record chart. Since times on this chart are plotted horizontally in thousands of a second and the whole chart is only three or four feet long for a period of several seconds the necessity of having this break sharply defined, is easily apparent.

The purpose of the vacuum tube 25 is substantially that of a rectifier for converting the oscillating currents to pulsating ones which, by filtration are reduced to an average value changing in the low audio rather than in the high frequency range. It is obvious that other rectifying means may be made use of, such as the characteristic crystal detector, a copper oxide rectifier as shown in Figure 10 or a two-element vacuum tube or the like as shown in Figure 11. This rectifier may be coupled to the oscillating circuit by means of a transformer as shown in Figure 1 or by a condenser coupling as later to be described in connection with Figure 7. The reference characters in Figures 10 and 11 are the same as in Figure 1.

If use is made of a thermionic tube as a detector or rectifier, advantage is gained because it simultaneously amplifies and does not draw appreciable current from the resonant circuit. It is found that a sharper break is obtained if such a detector tube is operated on the grid-condenser, grid-leak basis. For small signals (or for the initial cap break) grid leak detectors are more sensitive than plate detectors. For large signals, plate detectors are much more sensitive than grid detectors, especially since the average value of plate current in a grid leak detector cannot vary more than from the no signal value to zero. Hence, grid leak detectors give a sharper break than plate detectors in comparison to the maximum deviation.

A circuit for operation with a grid-condenser is shown in Figure 7 where elements to the left of the inductance 18 are identical with those described in connection with Figure 1. A direct coupling to the tube is made use of, however, instead of a transformer coupling, the grid of the tube being connected to the inductance 18 through a grid-condenser 50 and the cathode to the other end of the inductance 18 by a direct wire 51. A suitable grid leak 52 is directly connected between the grid and the cathode. The output circuit of the tube is identical with that of Figure 1.

In operation the oscillating circuit applies the voltage, represented in Figure 2, to one plate of the condenser 50 and the second plate of the condenser transfers it to the grid of the tube causing the plate current of the tube to vary as indicated in Figure 4. Here the first large swing is positive and the grid of the tube draws appreciable current (electrons). If this excess of electrons accumulated on the grid does not block the plate current, then when the grid goes positive again there will be sufficient electrons impinged on the grid from the cathode 27 to bias the tube to a potential appreciably below cut-off so that only on large voltage swings of the grid does any plate current flow.

If in this construction the grid leak 52 is made of sufficiently high resistance, say on the order of 10 megohms or more, the tube can be made to block upon the receipt on the grid of the first substantial pulsation in the negative direction, for the negative ions on the grid cannot leak away except very slowly. The result of this arrangement is to produce a curve such as shown in Figure 9 where the plate current decreases rapidly from the sharp point of inflection 45 to zero. Until the negative ions on the grid leak away, further signals applied to the grid have no effect on the plate current. Under these conditions the movable element of the recorder becomes quiet almost instantly after the receipt of the time-break and is in suitable condition for recording the vibrations represented by the seismometer, also connected to the same element. By properly choosing the characteristics of the tube, the bias, the potential applied to the grid, and the decrement of the resonant circuit, the time-break can be made exceedingly sharp and of only momentary duration, although the tube may again be sensitized by the operation of the grid leak after the expiration of several seconds as shown at 46, but by this time the seismometer record will have been completed.

The curve of Figure 5 represents the current flowing in the primary of the transformer which couples the tube output to the recording galvanometer, but the actual current flow in the secondary of the transformer will be somewhat different under most conditions. Pulsating direct current of any reasonable frequency in the primary produces alternating current in the secondary with the direction of flow opposite therein for current increases and current decreases in the primary. If the current in the primary abruptly changes there is a reflection of this in the secondary, but if the primary current remains constant the current in the secondary is reduced to zero. Therefore when the circuit 16, 17, 18 has a very low damping the primary current of the circuit of Figure 1 will increase suddenly and remain at a high value or, with a grid-condenser detector as in Figure 7 when 16, 17, 18 have very low damping, or in Figure 8 when 41 and 42 have very low damping, the current in the primary of transformer 33 will decrease suddenly and remain at zero as shown in Figure 9. In either case the effect of this sort of time-break on the recording galvanometer will be much as shown in Figure 6 since as soon as a steady current flows in the primary the secondary current drops abruptly to zero. Actually Figure 6 shows secondary current intensity without respect to sign. With positive primary current as shown in Figure 5, the secondary current would be negative. Furthermore, any very slow changes of current in the primary have but little effect on the current and voltage in the secondary so that vacuum tube circuits which may be made to respond to very low frequencies may have an output which will not be recorded in its entirety by the galvanometer.

For best results it is found that the oscillating circuit should be of the so-called high-Q type where the ratio of inductance to resistance is high so that the necessary internal resistance does not induce too great damping. The frequency of oscillation of this circuit should also be relatively high as determined from the previously mentioned formula because this gives sharper breaks. By having low damping as a result of a proper selection of constants of 16, 17, and 18 of Figure 1 according to the second equation, above, there will be practically no current change in the output of the tube after the first sudden rise and this may hold true throughout the time necessary to complete a seismometer record. This is another way of producing a break similar to that illustrated in Figure 9 which results from the circuit of Figure 7.

A further circuit which may be advantageously used is shown in Figure 8. Here the conventional blaster and cap are illustrated with the cap connected in shunt to the primary 40 of an iron or air core transformer. If desired, an inductance may be arranged in the circuit as shown at 39 for the purpose explained in connection with Figure 1. The secondary 41 of the transformer is in a resonant circuit comprising in addition the condenser 42. The necessary resistance to provide suitable damping is imparted to the circuit by the hysteresis of the iron core and the resistance in the windings. This resonant circuit is directly coupled to the grid of the vacuum tube through the conventional grid condenser and grid leak shown respectively at 43 and 44. The circuit is otherwise similar to those already described.

The use of a grid leak detector in this and other circuits is valuable for several reasons, the first being to increase the ratio of sharpness of the break with respect to the maximum deviation. It is desired to keep the deviation relatively small so as not to disrupt the moving element of the galvanometer or set it violently swinging so that it cannot be quickly damped to record the subsequent seismometer vibrations. This small deviation is also valuable when modulated on a radio transmitter to prevent overmodulation. A second purpose is to make the circuit ineffective to successive oscillation kicks which might serve to disturb the seismic trace and the third purpose is to provide a substantially uniform size of break which can be done particularly well because of the first effect of the grid-leak type detector in lowering the plate current. If it is permitted to lower it to zero as described above, subsequent pulsations can have no further effect and the size is thus fixed as that resulting from the change from "no signal" value to zero.

The ratio of the sharpness of the break to the maximum amplitude thereof will be increased by the grid-leak circuit because the tube operates reasonably far up on the $E_G$–$I_P$ curve where the gain is large, before the oscillations are put on the grid, and hence is very sensitive to the first part of the oscillations. Then as the grid is driven more negative the gain of the tube is reduced toward zero as a limit and will thus limit the magnitude of the maximum plate current deviation. Then since the maximum deviation is fixed, the grid may now receive a train of oscillations 100 or 1,000 times as large as would be required to make the peak deviation reach this maximum and yet the deviation will not exceed this amount, but up to this point any deviations would be magnified 100 or 1,000 times which would increase the sharpness of the break.

The various condensers shown in the several circuits are always shunted by one of the resistances or inductances in the circuit so that they can never retain sufficient charge to be dangerous. By that is meant, they can never discharge abruptly through the blasting cap circuit when the same is being connected and thus result in premature explosions.

Having thus described the invention, what is claimed as new and desired to be secured by Letters Patent is:

1. The method of obtaining a time-break signal for seismic surveying purposes comprising the steps of interrupting the current flow in a blasting cap firing circuit by a blast, causing said interruption to generate high frequency oscillations in another circuit, rectifying said oscillations to produce a pulsating direct current output and recording the average of said output.

2. The method of obtaining a time-break signal for seismic surveying purposes comprising the steps of interrupting the current flow in a blasting cap firing circuit by a blast, causing said interruption to generate high frequency oscillations in a "high-Q" circuit, rectifying said oscillations to produce a pulsating direct current output and recording the average of said output.

3. In the method of seismic surveying comprising electrically firing a blast and recording the time thereof and the time of arrival of the seismic waves thus generated at a seismometer station, the steps of causing the blast to open a circuit in which current is flowing, generating high frequency oscillations in a second circuit coupled to the first circuit as a result of said opening, rectifying said oscillations to change them to pulsating direct current, filtering said direct current to produce a recordable average current and supplying said average current to a recorder.

4. In the method of seismic surveying comprising electrically firing a blast and recording the time thereof and the time of arrival of the seismic waves thus generated at a seismometer station, the steps of causing the blast to open a circuit in which current is flowing to thereby generate oscillations in a second circuit, feeding said oscillations to the control element of a thermionic tube, causing the first of said oscillations to reduce the plate current of the tube to zero to prevent further operation of the tube until the seismometer signals have been recorded, and recording the plate current change as produced.

5. In the method of seismic surveying comprising electrically firing a blast and recording the time thereof and the time of arrival of the seismic waves thus generated at a seismometer station, the steps of causing the blast to open a circuit in which current is flowing to thereby generate oscillations in a second circuit, feeding said oscillations to the control element of a thermionic tube, regulating the size of the first of said oscillations and the normal bias on said control element whereby the plate current of the tube is reduced to zero by said first oscillation, and regulating the negative election flow from said element to prevent recovery of the plate current during the arrival of the generated waves at said seismometer station.

6. In the method of seismic surveying comprising electrically firing a blast and recording the time thereof and the time of arrival of the thus generated waves at a seismometer station, the steps of causing the blast to open a circuit in which current is flowing to thereby generate oscillations in a second circuit coupled thereto, selecting the constants of the second circuit to provide extremely low damping and high frequency oscillation, applying the potential oscillations of the second circuit to the control element of a thermionic tube whereby the plate current of the tube is changed from one constant value to another substantially constant value, and recording the effect of said plate current change on a coupling device.

7. Apparatus for recording the time-break of a blast for seismic surveying comprising the type in which the bridge wire of a blasting cap is connected to a blasting generator to heat the same and a record is made of the instant of breaking of the wire, the combination therewith of a closed resonant circuit coupled with said cap circuit and adapted to be excited and placed in oscillation at high frequency by the voltage change consequent to the breaking of said wire, a thermionic tube having a control element biased to permit plate current flow, means coupling said resonant circuit to said control element whereby the tube converts the steady plate current to one pulsating in unison with said oscillations, and a recording means responsive only to the average value of said plate current.

8. Apparatus for recording the time-break of a blast for seismic surveying comprising the type in which the bridge wire of a blasting cap is connected to a blasting generator to heat the same and a record is made of the instant of breaking of the wire, the combination therewith of a closed resonant circuit coupled with said cap circuit and adapted to be excited and placed in oscillation at high frequency by the voltage change consequent to the breaking of said wire, a thermionic tube having a control element biased to permit plate current flow, a condenser coupling said resonant circuit to said control element whereby the tube converts the steady plate current to one pulsating in unison with said oscillations, and a recording means responsive only to the average value of said plate current.

9. Means for increasing the sharpness of a time-break signal resulting from the breaking of the blasting cap bridge wire comprising a resonant circuit adapted to be set in oscillation at high frequency by the voltage change resulting from said breaking, a vacuum tube having a control element biased to normally provide a current flow in the output of the tube, means coupling said element to said circuit to superimpose the oscillation voltages on the said bias, a transformer having its primary winding traversed by said output current, and a recording galvanometer connected to the secondary of said transformer.

10. Means for increasing the sharpness of a time-break signal resulting from the breaking of the blasting cap bridge wire comprising a closed resonant circuit, means connecting an element thereof to have the voltage therein changed in unison with and as a result of the breaking of the bridge wire, a grid-condenser type thermionic detector, means energizing the control element of said detector from said circuit, a grid leak for said control element of such high resistance that the tube blocks almost instantly and is then ineffective for several seconds, means connected to and responding only to the average of the pulsating output current from said detector, and a recording galvanometer actuated by current from said means.

11. Means for increasing the sharpness of a time-break signal resulting from the breaking of the blasting cap bridge wire comprising a closed resonant circuit, means connecting an element thereof to have the voltage therein violently changed in unison with and as a result of the breaking of the bridge wire to generate oscillations in the resonant circuit, a grid-condenser type thermionic detector, means energizing the control element of said detector from said oscillating circuit, means connected to and responsive only to the average of the pulsating output of said detector, and a recording galvanometer actuated by current from said means.

JOSEPHUS O. PARR, Jr.